United States Patent [19]
DeLorme

[11] Patent Number: 5,199,733
[45] Date of Patent: Apr. 6, 1993

[54] SAFETY HITCH PIN

[76] Inventor: Glen E. DeLorme, 4622 W. Crystal Ave., Bartonville, Ill. 61607

[21] Appl. No.: 756,518

[22] Filed: Sep. 9, 1991

[51] Int. Cl.$^5$ .......................... B60D 1/02; F16B 21/00
[52] U.S. Cl. ...................................... 280/515; 24/453; 411/345
[58] Field of Search ...................... 280/515, 506, 491.5, 280/491.1; 24/453, 606, 607, 609; 411/340, 341, 344, 345, 549, 351

[56]  References Cited

U.S. PATENT DOCUMENTS

| | | | |
|---|---|---|---|
| 2,406,007 | 10/1943 | Eisele | 411/549 |
| 3,046,827 | 7/1962 | Myers | 24/453 X |
| 3,190,677 | 6/1965 | Robbins | 280/515 |

FOREIGN PATENT DOCUMENTS

| | | | |
|---|---|---|---|
| 938288 | 1/1956 | Fed. Rep. of Germany | 280/515 |
| 962225 | 4/1957 | Fed. Rep. of Germany | 411/344 |
| 541967 | 4/1956 | Italy | 280/515 |

Primary Examiner—Charles A. Marmor
Assistant Examiner—Florian Zeender
Attorney, Agent, or Firm—Leon Gilden

[57]  ABSTRACT

A hitch pin is arranged for coupling a tongue relative to a socket of a conventional hitch structure to include a central cylindrical body formed with a top plate member mounted to the body. The top plate member includes a plurality of first diametrically disposed latch members, each latch member including a concave saddle positioned at an upper end of each latch member at an upper end of a ramp of each latch member to receive a handle loop upon each saddle to withdraw a central lock rod through the cylindrical shaft. The lock rod includes an actuator plug mounted to the lock rod spaced from a lower terminal end thereof to effect displacement of a plurality of locking legs exteriorly of the shaft. The lower terminal end portion of the lock rod includes a lock rod lower end plate to capture a spring between the lower end plate and a cylindrical shaft cavity floor.

6 Claims, 4 Drawing Sheets

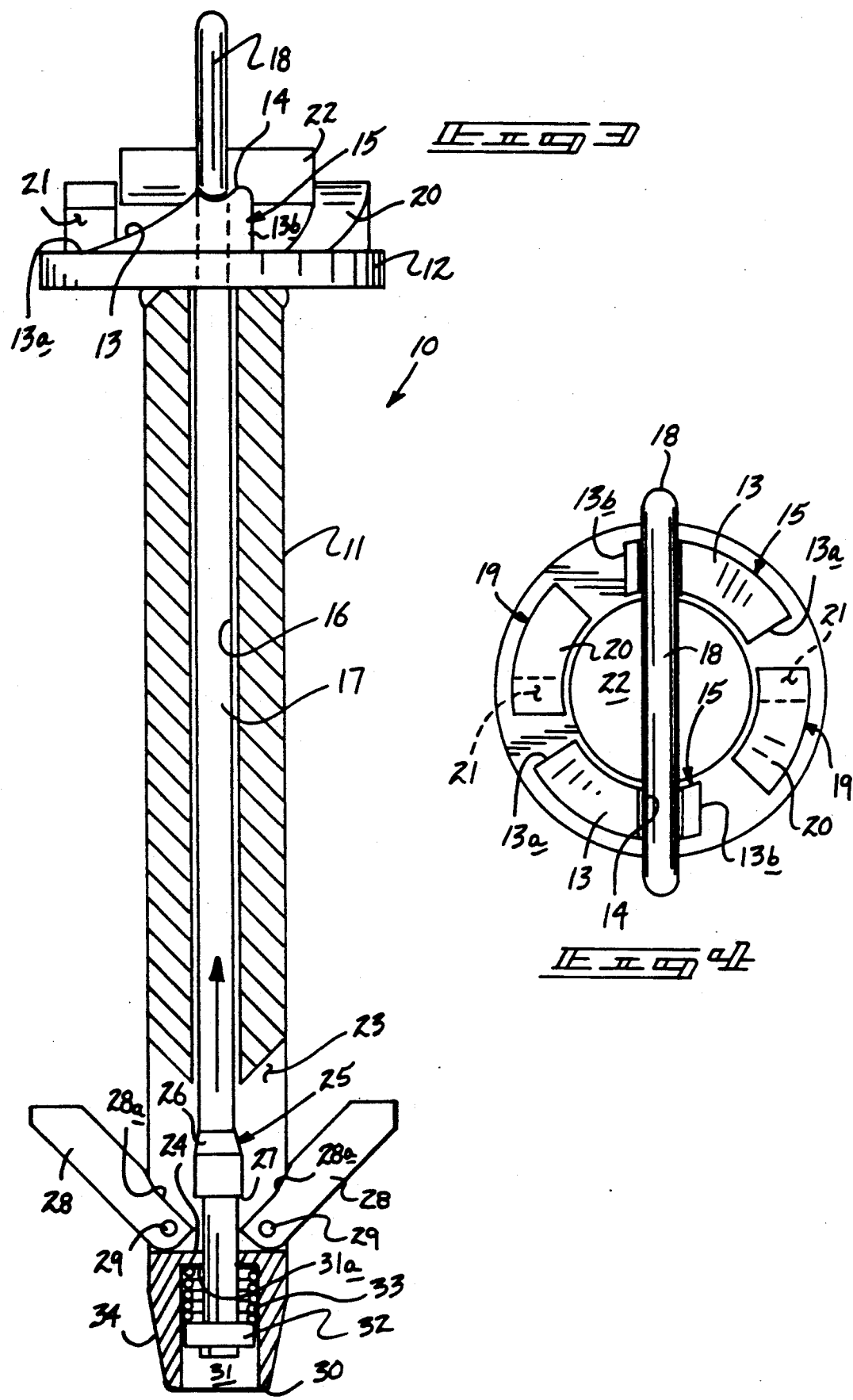

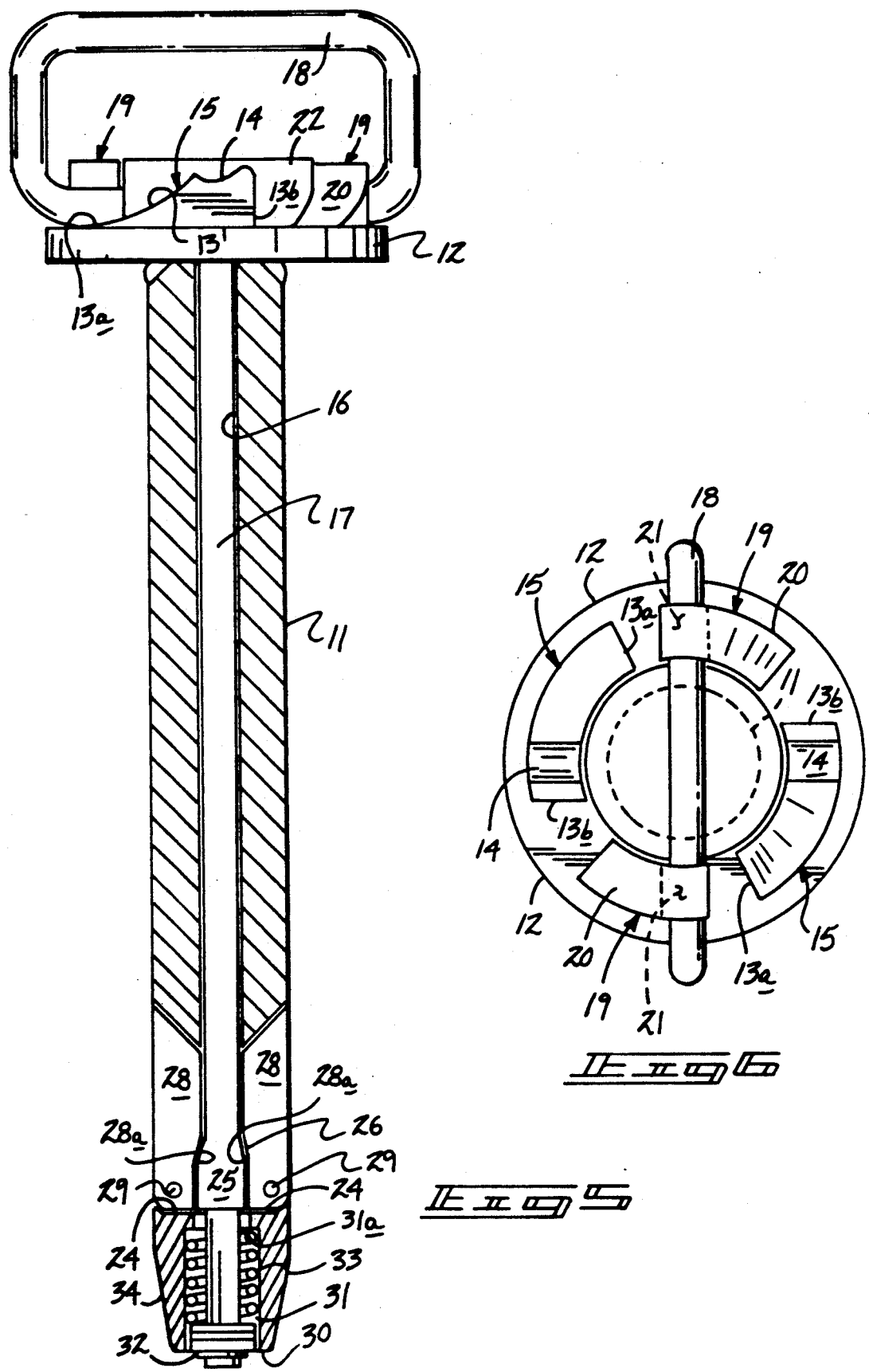

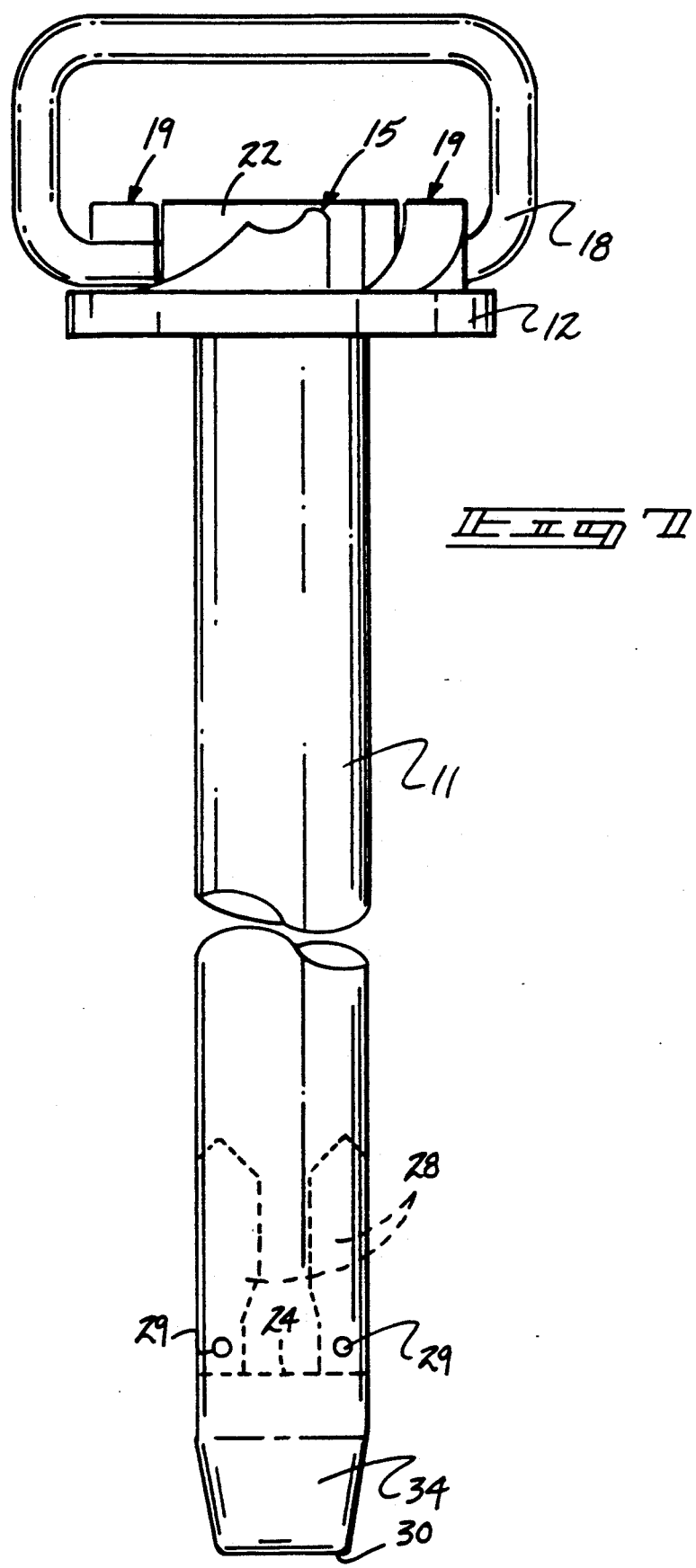

SAFETY HITCH PIN

BACKGROUND OF THE INVENTION

1. Field of the Invention

The field of invention relates to hitch pin apparatus, and more particularly pertains to a new and improved trailer hitch pin wherein the same is arranged to provide effective latching of a hitch pin relative to a trailer hitch assembly.

2. Description of the Prior Art

Tongue and socket assemblies such as is typically utilized in a farm environment utilize a draw bar receivable within a socket, with a hitch pin inserted to couple the draw bar relative to the socket. The hitch pin during such typical use is subject to vibration and encounter with various agricultural components, such as corn stalks and the like, to effect displacement of the hitch pin relative to the trailer hitch assembly. Attendant danger and damage to associated people and property is resultant from such inadvertent disassembly of the draw bar relative to its associated socket due to the cumbersome and extensive nature of typical trailer assemblies.

Prior art hitch pin structure has been utilized to prevent such occurrence and is typified in U.S. Pat. No. 3,825,284 to Behrle wherein a trailer hitch pin includes a top plate secured below a locking lug to position the hitch pin relative to the coupling structure.

U.S. Pat. No. 4,783,094 to Sands wherein the hitch pin is prevented from dislodgement by an overlying flange secured in an overlying position relative to the hitch pin by a rearwardly oriented locking pin assembly.

U.S. Pat. No. 4,555,125 to Goodlove; U.S. Pat. No. 4,650,207 to Ackermann; and U.S. Pat. No. 4,671,528 to Thompson set forth further hitch pin latching assemblies.

As such, it may be appreciated that there continues to be a need for a new and improved safety hitch pin as set forth by the instant invention which addresses both the problems of ease of use as well as effectiveness in construction in maintaining mechanical association of a draw bar relative to an associated socket structure and in this respect, the present invention substantially fulfills this need.

SUMMARY OF THE INVENTION

In view of the foregoing disadvantages inherent in the known types of safety hitch pin apparatus now present in the prior art, the present invention provides a safety hitch pin wherein the same is arranged to include locking legs mounted within the hitch pin body displaced from the hitch pin body to position the legs below an associated coupling to maintain the hitch pin in the coupling during use. As such, the general purpose of the present invention, which will be described subsequently in greater detail, is to provide a new and improved safety hitch pin which has all the advantages of the prior art safety hitch pin apparatus and none of the disadvantages.

To attain this, the present invention provides a hitch pin arranged for coupling a tongue relative to a socket of a conventional hitch structure to include a central cylindrical body formed with a top plate member mounted to the body. The top plate member includes a plurality of first diametrically disposed latch members, each latch member including a concave saddle positioned at an upper end of each latch member at an upper end of a ramp of each latch member to receive a handle loop upon each saddle to withdraw a central lock rod through the cylindrical shaft. The lock rod includes an actuator plug mounted to the lock rod spaced from a lower terminal end thereof to effect displacement of a plurality of locking legs exteriorly of the shaft. The lower terminal end portion of the lock rod includes a lock rod lower end plate to capture a spring between the lower end plate and a cylindrical shaft cavity floor.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved safety hitch pin which has all the advantages of the prior art hitch pin apparatus and none of the disadvantages.

It is another object of the present invention to provide a new and improved safety hitch pin which may be easily and efficiently manufactured and marketed.

It is a further object of the present invention to provide a new and improved safety hitch pin which is of a durable and reliable construction.

An even further object of the present invention is to provide a new and improved safety hitch pin which is susceptible of a low cost of manufacture with regard to both materials and labor, and which accordingly is then susceptible of low prices of sale to the consuming public, thereby making such safety hitch pins economically available to the buying public.

Still yet another object of the present invention is to provide a new and improved safety hitch pin which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic elevational view, partially in section, of the hitch pin structure utilized by the invention.

FIG. 4 is an orthographic top view of the instant invention.

FIG. 5 is an orthographic side view of the instant invention, partially in section, illustrating the trailer hitch pin in an association to maintain the locking legs positioned within the associated shaft cavity.

FIG. 6 is an orthographic top view of the hitch pin structure as set forth in FIG. 5.

FIG. 7 is an orthographic side view of the hitch pin structure.

DESCRIPTION OF THE PREFERRED EMBODIMENT

Figure 1:
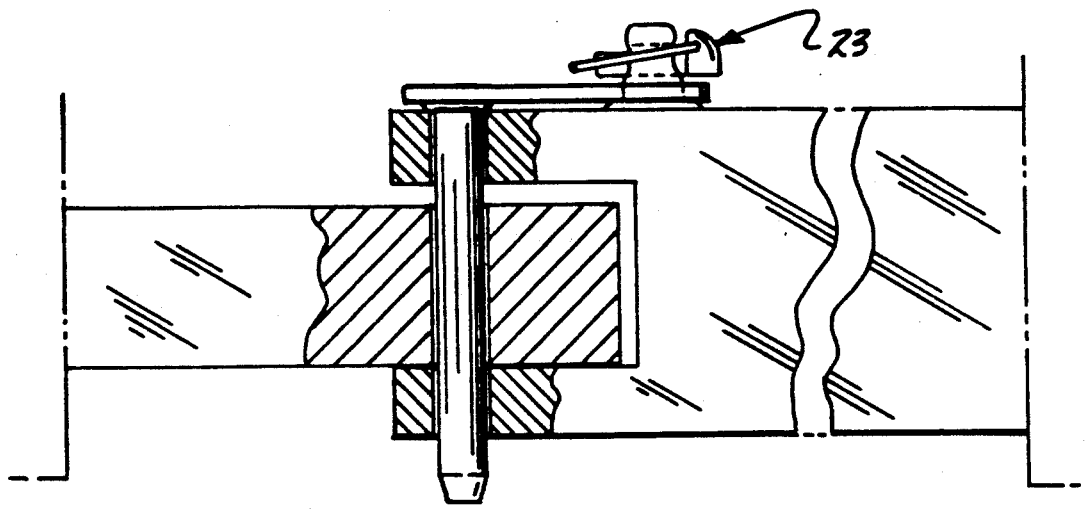
FIG. 1 is an orthographic view, partially in section, of a prior art trailer hitch pin apparatus.

With reference now to the drawings, and in particular to FIGS. 1 to 7 thereof, a new and improved safety hitch pin embodying the principles and concepts of the present invention and generally designated by the reference numeral 10 will be described.

Figure 2:
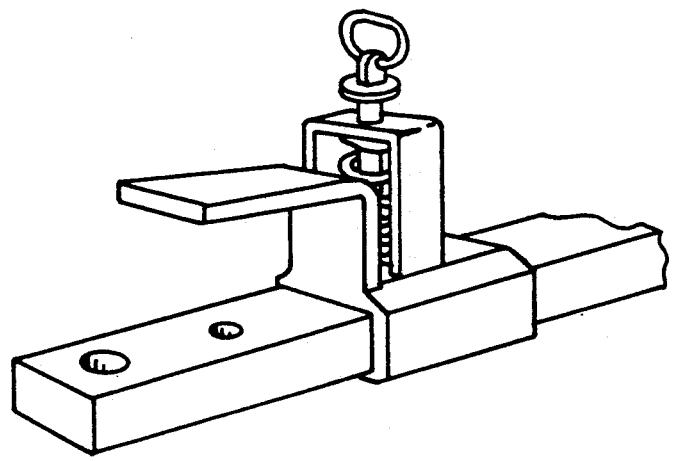
FIG. 2 is an isometric illustration of a further safety hitch pin structure utilized in the prior art.

FIG. 1 illustrates a prior art hitch pin structure, as set forth in U.S. Pat. No. 3,825,284, wherein the hitch pin utilizes a top plate member fixedly secured to the hitch pin that extends laterally of the hitch pin for positioning below an associated retaining pin structure 23. FIG. 2 illustrates a further prior art structure, as set forth in U.S. Pat. No. 4,783,094, wherein the overlying flange structure is mounted slidably upon a slide housing and the slide housing positioned in a displaced or forward position to overlie a hitch pin preventing its vertical displacement from its associated bore.

More specifically, the safety hitch pin 10 of the instant invention is utilized to maintain coupling of an associated draw bar relative to a socket, as set forth in FIG. 1 for example and in U.S. Pat. No. 3,825,284 incorporated herein by reference. The hitch pin structure 10 includes the cylindrical shaft 11, as illustrated, with a plate member 12 fixedly and orthogonally mounted to an upper terminal end of the cylindrical shaft orthogonally oriented relative to the axis of the cylindrical shaft. A plurality of diametrically disposed latch members 15 are mounted to a top surface of the plate member 12, wherein the latch members each include diametrically disposed first ramps 13, with a concave saddle recess 14 positioned at upper end portions of each of the first ramp 13 of each latch member 13. The ramps includes a first ramp lower entrance edge 13a that are diametrically aligned relative to one another, with a forward end wall 13b defining a forward end of each of the latch members 15. The concave saddle recesses 14 formed at the upper ends of the first ramps 13 are aligned to mount a horizontal handle leg of an associated handle loop 18. The handle loop 18, and particularly the leg thereof, includes a lock rod 17 mounted orthogonally to the handle loop 18 and coaxially directed through the cylindrical shaft 11 through an associated central conduit channel 16, as illustrated. A plurality of positioning lugs 19 are mounted to the top surface of the plate member 12 and rotated ninety degrees relative to each of the latch members 15, with the positioning lugs 19 diametrically aligned relative to one another. The positioning lugs 19 include positioning lug ramps 20 originating adjacent each forward end wall 13b of the associated latch members 15. The positioning lugs 19 include handle receiving cavities 21 that are positioned adjacent the first ramp lower entrance edges 13a, wherein the handle cavities 21 are arranged to receive the horizontal lower leg of the handle loop 18 when the handle 18 is rotatably displaced from the latch members 15, as illustrated in FIGS. 5 and 6. A cylindrical handle positioning block 20 is fixedly mounted about the handle loop lower horizontal leg positioned within the latch members 15 and the positioning lugs 19 to align the handle 18 in use. The height of the positioning block 22 is substantially equal to or greater than the height of the latch members 15 or the positioning lugs 19. A shaft cavity 23 is formed within the cylindrical shaft 11 adjacent the cylindrical shaft lower end 30. The shaft cavity 23 includes a shaft cavity floor 24, with a plurality of latch leg axles 29 that are arranged parallel relative to one another directed through the shaft cavity 23 adjacent the shaft cavity floor. Each of the latch leg axles 29 pivotally mount diametrically opposed latch legs 28 that are complementarily received within the shaft cavity 23 in a first position, as illustrated in FIG. 5, and are displaced relative to the shaft cavity 23 to a second position, as illustrated in FIG. 3. When displaced to the second position, the latch legs 28 are typically positioned below a coupling connection, as illustrated in FIG. 1, to prevent displacement of the hitch pin 10 relative to such a coupling connection. To effect displacement of the latch legs 28 to a second position from the first position, the lock rod 17 includes an actuator displacement plug 25 that includes a planar bottom surface 27 in abutment with the shaft cavity floor 24 in the first position, as illustrated in FIG. 5, wherein vertical projection and lifting of the handle 18 to position the lower handle horizontal leg within the concave saddle recesses 14, as illustrated in the FIG. 3, lifts and displaces the actuator displacement plug 25 and effects abutment with the latch legs 28 to displace the latch legs radially and outwardly relative to the shaft cavity 23. In the first position, the actuator displacement plug 25 includes a conical top actuator surface 26 and a cylindrical bottom surface received within latch leg recesses 28a formed within top edges of each of the latch plates 28, as illustrated in the FIGS. 3 and 5.

The cylindrical shaft lower end 30 includes a cylindrical shaft cavity 31 projecting into and coaxially aligned with the cylindrical shaft and terminating in a spaced relationship relative to the shaft cavity floor 24. The lock rod 17 includes a lock rod lower end plate 32, with the cylindrical shaft cavity 31 including a cylindrical shaft cavity floor 31a to capture a spring 33 between the lock rod lower end plate 32 and the cylindrical shaft cavity floor 31a. The spring 33 maintains the handle loop 18 in engagement with the conical saddle recesses 14 in the second position or maintained within the handle cavities 21 in a first position, as illustrated in the FIGS. 3 and 5 respectively. Further, the cylindrical shaft 11 includes a cylindrical shaft conical lower end portion 34 to ease projection of the hitch pin within an associated hitch coupling, such as of a type illustrated in FIG. 1.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A safety hitch pin apparatus for reception within a trailer coupling, wherein the apparatus comprises,
    a cylindrical shaft, the cylindrical shaft including a plate member fixedly and orthogonally mounted to an upper terminal end of the cylindrical shaft, and the cylindrical shaft including a central conduit channel directed through the cylindrical shaft, and the cylindrical shaft including a lower terminal end, and
    a lock rod slidably disposed within the cylindrical shaft and projecting through the cylindrical shaft lower terminal end, and
    a shaft cavity formed within the cylindrical shaft spaced from the lower terminal end, and
    lock means pivotally mounted within the shaft cavity for projection exteriorly and radially of the cylindrical shaft in a second position from a first position, with the lock means completely contained within the cylindrical shaft, and
    actuator means mounted on the lock rod for effecting projecting of the lock means from the first position to the second position, and
    the cylindrical shaft includes a cylindrical shaft lower cavity coaxially contained within the cylindrical shaft projecting interiorly from the lower terminal end, and the lock rod including a lock rod lower end plate, and the lower cavity including a lower cavity floor spaced from and parallel to the cylindrical shaft lower terminal end, and a spring captured between the lock rod lower end plate and the lower cavity floor, the lower cavity floor positioned below the shaft cavity, and the shaft cavity including a shaft cavity floor, and the actuator means including an actuator means bottom surface, with the bottom surface in abutment with the shaft cavity floor in the first position, and displaced from the shaft cavity floor in the second position.

2. An apparatus as set forth in claim 1 wherein the lock means includes a plurality of diametrically disposed latch legs, the latch legs each including a latch leg axle, the latch leg axles of the latch legs arranged in a parallel position on opposed sides of the actuator means, and the latch legs including latch leg recesses to complementarily receive the actuator means in the first position.

3. An apparatus as set forth in claim 2 wherein the actuator means includes a conical top actuator surface spaced above a cylindrical actuator lower surface, wherein the cylindrical actuator lower surface includes the planar bottom surface.

4. An apparatus as set forth in claim 3 wherein the lock rod includes a handle loop, the handle loop including a handle loop lower horizontal leg, the lower horizontal leg arranged parallel to a plate member top surface, and the plate member top surface including a plurality of latch members fixedly mounted thereon, wherein the latch members are diametrically disposed upon the plate member top surface on opposed sides of the conduit channel, and the latch members each include a first ramp, each first ramp includes a ramp lower entrance edge, each lower entrance edge is arranged in a diametrically aligned orientation relative to one another, and each first ramp includes a concave saddle recess formed at an upper terminal end of each first ramp to receive the lower horizontal leg of the handle loop in the second position.

5. An apparatus as set forth in claim 4 including a plurality of positioning lugs, the positioning lugs displaced ninety degrees relative to the latch members on diametrically opposed sides of the conduit channel, and the positioning lugs each include second ramps, and each of the latch members includes a latch member forward end wall, the forward end wall arranged orthogonally relative to the plate member top surface, and the second ramps positioned adjacent each forward end wall of each latch member, and the positioning lugs further including a positioning lug handle cavity, each positioning lug handle cavity positioned adjacent the first ramp lower entrance edge of each latch member to complementarily receive the lower horizontal leg of the handle loop therewithin when the lock rod is in the first position.

6. An apparatus as set forth in claim 5 wherein the handle loop lower horizontal leg includes a cylindrical handle positioning block positioned adjacent to and interiorly of the latch members and the positioning lugs to align the handle loop within the latch members and the positioning lugs.

* * * * *